UNITED STATES PATENT OFFICE.

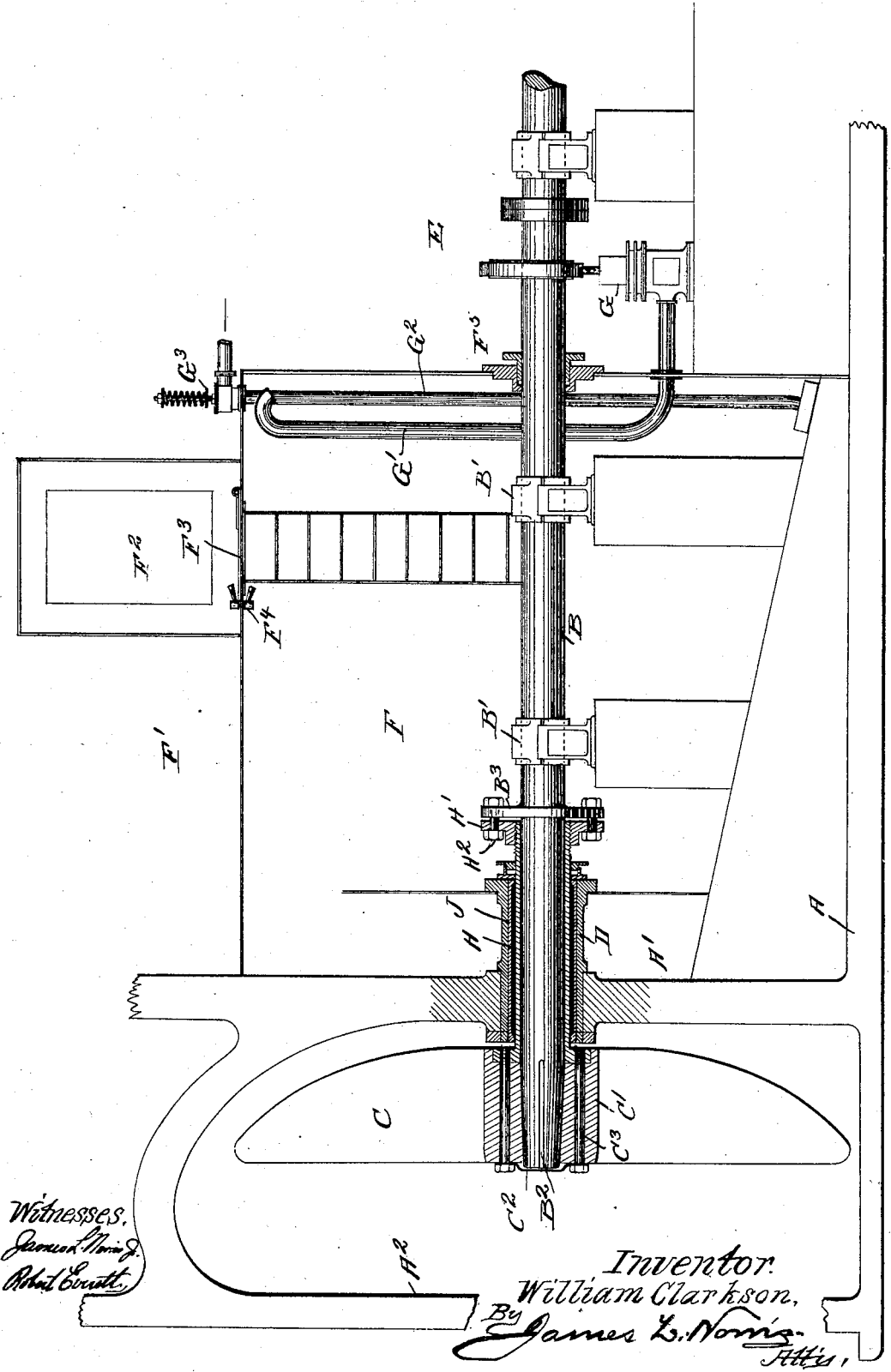

WILLIAM CLARKSON, OF LARGS BAY, SOUTH AUSTRALIA, AUSTRALIA.

PROPELLER-SHAFT MOUNTING AND BEARING.

No. 796,810.　　　　Specification of Letters Patent.　　　　Patented Aug. 8, 1905.

Application filed December 7, 1903. Serial No. 184,185.

*To all whom it may concern:*

Be it known that I, WILLIAM CLARKSON, engineer, a subject of the King of Great Britain, residing at Military Road, Largs Bay, in the State of South Australia, in the Commonwealth of Australia, have invented certain new and useful Improvements in Propeller-Shaft Mountings and Bearings, of which the following is a specification.

My invention relates to certain improvements in the fitting and mounting of propeller-shafts of steamships and in bearings therefor, and refers more particularly to the fitting and mounting of the tail-shafts of steamships and to the attachment of the propeller thereto and in bearings therefor.

In the fitting and mounting of propeller-shafts as at present practiced the tail-shaft is surrounded by brass or other casings and the whole works within a stern-tube having bearings at each end, of preferably "lignum-vitæ," and the shaft is thus allowed to work within water which floods the said tube. The water within this tube causes the corrosion of the shaft, particularly at the edges of the brass casings, and fractures usually occur at these places. The tail-shaft being mounted within the tube is thus inaccessible when at sea in the event of a fracture, and it is found difficult to repair the same without docking the vessel.

The object of my invention is to so fit and mount propeller-shafts of steamships and to provide bearings therefor that the water is kept out of contact with the shaft, thereby preventing corrosion, and at the same time means are provided for rendering the same at all times accessible, provision being also made for renewing the tail-shaft without the necessity of docking. I accomplish this object by providing a compartment surrounding the tail-shaft, within which a certain pressure of air is maintained sufficient to keep out the water. This compartment is provided with an air-lock, rendering it accessible, while the shaft is mounted in ordinary bearings or plumber-blocks. The propeller is further attached to the tail-shaft by fastenings arranged inside the aforesaid compartment in such a manner that they are at all times accessible, and if necessary the tail-shaft may be withdrawn and replaced if required.

In order that my invention may be the better understood, I will now proceed to describe the same with reference to the accompanying drawing, in which is shown a longitudinal section of the stern part of the vessel, showing the application of my invention.

A is the keel of the vessel, having a vertical stern-post $A'$ and rudder-post $A^2$. Within this stern-post $A'$ is mounted the tail-shaft B, having on its outer end a propeller C, preferably attached as hereinafter described. The tail-shaft B works in a bearing in a short tube D, fixed in the stern-post $A'$, and is further mounted in ordinary bearings $B'$, arranged at suitable intervals, and extends through the section E to the engines in the usual way. At the after end of the section E is provided an air-tight compartment or chamber F, surrounding the tail-shaft B. This compartment or chamber F may be the after tank adapted for the purpose and is provided with an auxiliary chamber $F'$, having air-tight doors $F^2$ and $F^3$ and a tap $F^4$, thereby forming an air-lock. Though shown in the drawing as arranged at the top of the compartment F, it will be well understood that the chamber $F'$ may be in any convenient position to allow of accessibility to the compartment or chamber F. The bulkhead forming the division between the compartment F and the section E is provided with a stuffing-box or gland $F^5$, surrounding the shaft B, whereby the chamber or compartment F is maintained air-tight.

The chamber or compartment F is maintained under a suitable pressure of air sufficient to keep the water from entering through the bearing in the tube D. For this purpose I provide an air-pump G, preferably arranged within the engine-room; but for convenience of description the pump G is shown in the accompanying drawing as actuated by means of an eccentric working on the shaft B. A pipe $G'$, leading from the air-pump G, discharges into the top of the chamber F, as shown, while a bilge-pipe $G^2$ is also provided, leading from the lowermost point of the chamber F. This bilge-pipe $G^2$ is provided with a pressure-valve $G^3$, and thence leads overboard, whereby any water which may accumulate in the chamber F is discharged overboard.

In practice a head of air is maintained within the chamber F greater than the head of water without, being sufficient to prevent the water from entering through the bearing D, according to the depth of the vessel. In this way the ordinary stern-tube may be dispensed with and the shaft always maintained dry, thereby preventing corrosion, while at the same time the shaft is always accessible by means of the auxiliary chamber F'. Furthermore, either white metal or lignum-vitæ may be provided in the tube D on the stern-post A', and both these bearings and the bearing B' within the compartment F are lubricated with oil under pressure in any well-known manner.

The propeller C is preferably attached to the shaft B in such a manner that the fastenings are arranged within the vessel and are at all times accessible. For this purpose the boss C' of the propeller C is provided with an extending sleeve H. This sleeve H is made, preferably, of steel and is bolted to the propeller-boss C' by means of bolts $C^3$. The sleeve H extends through the bearing-tube D and is bored internally to allow of the shaft B being passed through the same. The shaft B is tapered as at present, at its outer end fitting within the tapering hole or recess in the propeller-boss C'. The shaft B is provided with a tapering keyway $B^2$, which engages a corresponding tapering feather arranged within the interior of the boss C', while a cap $C^2$ is provided on the outside of the boss C' to prevent the ingress of any water to the shaft B. The inner end of the sleeve H is provided with a screw-flange H', which is bolted, by means of the bolts or stubs $H^2$, to a stationary collar $B^3$ upon the tail-shaft B, or, if required, this stationary collar $B^3$ may be in the shape of a coupling providing shorter lengths of shaft. An auxiliary gland J is also provided, mounted upon the outside of the sleeve H, by which the water may be kept out should the air-pressure within the chamber F be removed. It will thus be seen that in operation the feather within the keyway $B^2$ takes the torsional strain as the shaft is rotated, while the sleeve H around the shaft B works in the bearings within the tube D, while the sleeve H and bolts or stubs $H^2$ take the back thrust. Furthermore, the shaft B may be at any time removed from the propeller-boss C' by releasing the bolts or stubs $H^2$ and withdrawing inward, the sleeve H serving to support the propeller C on the bearing D in the stern-post A'. At the same time the cap $C^2$ on the outside face of the propeller-boss C' will prevent any water from flowing in through same to the interior of the compartment. The auxiliary gland J prevents the inflow of water between the steel sleeve H and stern-bearing D when the pressure of air within the compartment F is relieved. When the tail-shaft B has been removed, another is replaced, being forced outward through the steel sleeve H, engaging the propeller-boss C', as before described, the keyway $B^2$ upon the tail-shaft B being carefully positioned to engage the feather in the propeller-boss C'. The shaft B is then forced home, and the screw-flange H' is screwed up to the fixed collar $B^3$ on the tail-shaft B by bolts or stubs $H^2$, and the repairs are thereby easily effected without any necessity for docking.

Having thus described my invention, what I claim, and desire to secure by Letters Patent of the United States, is—

1. In the fitting and mounting of propeller-shafts of steamships and in bearings therefor, the combination with an air-tight compartment surrounding the tail-shaft, of an air-pump having a pipe discharging into the top of the said compartment, the said compartment being provided with a discharge bilge-pipe having a pressure-valve and discharging overboard, substantially as described.

2. In the fitting and mounting of propeller-shafts of steamships and in bearings therefor, the combination with an air-tight compartment surrounding the tail-shaft having an auxiliary chamber with air-tight doors forming an air-lock, of a pump having a pipe discharging into the top of the said compartment, the said compartment being provided with a bilge-pipe having a pressure-valve and discharging overboard, substantially as described.

3. In the fitting and mounting of propeller-shafts of steamships and in bearings therefor, the combination with an air-tight compartment surrounding the tail-shaft and having means for maintaining a certain pressure of air sufficient to keep out the water, of a sleeve attached to the propeller-boss and extending inward through the bearings in the stern-post and having a screw-flange on its inner end by which it is bolted to a stationary collar on the said tail-shaft, substantially as described.

4. In the fitting and mounting of propeller-shafts of steamships and in bearings therefor, the combination of an air-tight compartment surrounding the tail-shaft, means for maintaining it under a certain pressure of air sufficient to keep out the water, a sleeve attached to the propeller-boss surrounding the said shaft and extending inward through the bearings in the stern-post, a screw-flange on the inner end of the said sleeve bolted to a stationary collar on the said tail-shaft, means on the outer end of the shaft adapted to engage the interior of the propeller-boss, a water-tight cap arranged on the outside of the propeller-boss, substantially as described and for the purposes indicated.

In testimony whereof I have hereunto set my hand in presence of the subscribing witnesses.

WILLIAM CLARKSON.

Witnesses:
 CHAS. A. MURPHY,
 CHARLES S. BURGESS,
 CLEMENT A. HACK.